Patented May 3, 1949

2,469,088

UNITED STATES PATENT OFFICE 2,469,088

PROCESS OF PRODUCING ALUMINA

Jason F. Thompson, East St. Louis, Ill., assignor to Aluminum Company of America, Pittsburgh, Pa., a corporation of Pennsylvania No Drawing. Application April 11, 1946,
Serial No. 661,345

2 Claims. (Cl. 23—142)

This invention relates to the calcination of aluminum hydroxide to form alumina, and relates particularly to the production of alumina of low soda content.

In connection with the calcination of aluminum hydroxide containing a sodium compound or compounds—usually referred to as soda ($Na_2O$)—to convert the aluminum hydroxide to alumina, it has been proposed in U. S. Patent 2,069,060 to Fessler to add boric oxide in the form of boric acid to the aluminum hydroxide with the result that during the calcination the boric oxide and soda are driven off in the form of gaseous sodium-boron compound, referred to herein as sodium borate. For best results with that procedure the material being calcined is heated at a temperature of at least 1300° C. in the calcining kiln, and sufficient boric acid is used to provide a molecular ratio of boric oxide to soda of at least 1:1. By thus removing soda values from the material being calcined, an alumina of low soda content can be produced.

The calcination is normally effected by passing hot gases through a rotating kiln, countercurrent to the material being calcined. Fine particles of alumina are picked up by the hot gases and carried out of the kiln; in order to avoid loss of such alumina values the gases may be passed through a suitable means for separating solids from the gases, such as a cyclone dust collector, where the alumina dust is recovered. The dust is then returned to the kiln where it is mixed with the material being converted to alumina.

However, I have found that gaseous sodium borate produced as described above condenses in the low temperature section of the kiln and is carried into the dust collector and mingles with the alumina recovered there. Such sodium borate is returned to the kiln along with the alumina dust, and part of it may not volatilize during subsequent calcination in the kiln. As a result the alumina discharged from the kiln is contaminated with soda values from the sodium borate. Through continued operation of the process, with the attendant returning of an increasing amount of sodium borate to the kiln from the dust collector, and consequent increase in the amount of sodium borate which is not volatilized during the calcination of the alumina hydroxide, the amount of soda in the alumina leaving the kiln gradually increases until in time the alumina obtained is not sufficiently low in soda for some purposes, and the benefit of the addition of boric oxide to the aluminum hydroxide is partially or even completely lost.

It is the object of this invention to provide a procedure for preventing the return of sodium borate to the kiln from the dust collector during alumina-producing operations of the type described above.

I have found that by leaching with water the solids recovered from the dust collector which removes the alumina dust from the gases leaving the kiln employed in calcining aluminum hydroxide to alumina as described above, sodium borate present can be dissolved away from the alumina. Upon separating the alumina from the leach water, alumina substantially free from sodium borate is obtained. Thus the return of sodium borate to the calcining kiln along with the alumina is avoided, with the result that alumina low in sodium ion content is obtained from the calcining kiln.

The leaching operation can be carried out by merely immersing the solids from the dust collector in water in a suitable tank. Ordinarily it is sufficient, if enough water is used to cover the solids, and the slurry is allowed to stand for ½ hour at room temperature. However, the duration of the leach depends to some extent on the degree to which it is desired to free the powder from sodium borate. Likewise, the time required may be shortened somewhat by agitating the slurry, or by employing hot water. Upon draining off the leach water, the alumina from the slurry can be mixed with aluminum hydroxide to be calcined, thereby returning the alumina to the calcining kiln.

By use of the procedure described above, alumina having a soda content of not over 0.05 per cent has been consistently produced by calcining aluminum hydroxide containing about 0.40 per cent of soda, whereas under the same conditions, except that the solids from the dust collector are returned to the kiln without being leached, the alumina produced contains considerably more than 0.05 per cent of soda.

In addition to the effect of this invention on the soda content of the alumina, a further advantage is obtained as a result of the fact that if sodium borate is present during calcination of aluminum hydroxide to alumina, the growth of the ultimate particles during calcination is promoted. By removing sodium borate from the system as described above, that effect of the sodium borate is avoided, and consequently smaller ultimate particles of alumina are produced in the calcination than would otherwise be the case.

I claim:

1. The process comprising calcining a mixture of aluminum hydroxide and boric oxide in a kiln at a temperature at which the boric oxide and soda from the aluminum hydroxide volatilize, recovering a mixture of alumina and sodium borate from gas leaving the said kiln, separating sodium borate from the alumina of the last-mentioned mixture, and returning the said alumina to the calcining kiln.

2. The process comprising calcining a mixture of aluminum hydroxide and boric oxide in a kiln at a temperature at which the boric oxide and soda from the aluminum hydroxide volatilize, recovering a mixture of alumina and sodium borate from gas leaving the said kiln, dissolving sodium borate present in the last-mentioned mixture, separating the resulting solution from the alumina, and returning the said alumina to the calcining kiln.

JASON F. THOMPSON.

REFERENCES CITED

The following references are of record in the file of this patent:

UNITED STATES PATENTS

| Number | Name | Date |
|---|---|---|
| 2,069,060 | Fessler | Jan. 26, 1937 |

OTHER REFERENCES

Mellor, Inorganic and Theoretical Chemistry, vol. 5, pages 71, 74, pub. by Longmans, Green, and Co., London, (1924).